United States Patent
Spauszus

[15] 3,655,948
[45] Apr. 11, 1972

[54] APPARATUS FOR AUTOMATICALLY EVALUATING RECORDINGS ON A RECORD CARRIER

[72] Inventor: Siegfried Spauszus, Villingen, Germany
[73] Assignee: Kienzle Apparate GmbH, Villingen, Germany
[22] Filed: Apr. 16, 1970
[21] Appl. No.: 29,018

[30] Foreign Application Priority Data

Apr. 26, 1969 Germany..................P 19 21 456.3

[52] U.S. Cl...............235/61.9 R, 235/61.11 E, 250/219 DD
[51] Int. Cl......................................G06k 3/00, E04g 17/00
[58] Field of Search....................235/61.9, 61.11 R, 61.11 E, 235/61.11 D; 250/219 DD, 219 QB, 219 FR; 101/93 R

[56] References Cited

UNITED STATES PATENTS

| | | | |
|---|---|---|---|
| 3,049,292 | 8/1962 | Meyers | 235/61.9 |
| 3,076,598 | 2/1963 | Bazard | 235/61.9 |
| 3,277,445 | 10/1966 | Diamant et al. | 235/61.9 |

Primary Examiner—Daryl W. Cook
Attorney—Michael S. Striker

[57] ABSTRACT

Circular concentric recordings on circular tracks of a record carrier, are automatically evaluated by an apparatus including sensing means for successively sensing each track, storage means for storing sensed information as numerical values, and printing means for printing the values. Program control means control the successive performance of the sensing, storing, and printing functions of the apparatus.

15 Claims, 4 Drawing Figures

3,655,948

INVENTOR
Siegfried Spauszus

APPARATUS FOR AUTOMATICALLY EVALUATING RECORDINGS ON A RECORD CARRIER

BACKGROUND OF THE INVENTION

In order to obtain optimum production conditions, it is known to check the operations of machines by automatic recording devices, which automatically record working time, the number of manufactured pieces, interruption of the operations, and other information so that the recorded diagrams can be evaluated by experts who then determine in which way the operations of the machine could be more economically performed.

Recording devices serving this purpose are known for individual machines, as well as for groups of machines, and are used for recording the time periods of actual running of the machine, or stopping of the machine, as well as the number of pieces produced during a certain time. Since several reasons would cause the interruption of the machine operations, for example a lunch break, the setting of the machine for a specific operation, the supply of material, and other factors, it is necessary that the operator of the machine operates a device for indicating in the recording the time during which the machine did not work, as well as the reason for the stopping of the machine. When a circular diagram disk is used as record carrier, each information to be registered is recorded in the form of a circular track, so that several concentric tracks are recorded. It is difficult to visually evaluate a graphical recording of this type, and the operation is very time consuming and may cause errors which falsify the recorded information. An automatic evaluation of the recorded diagrams is more reliable, and consequently preferable to evaluation by supervisors.

It is one object of the invention to provide an apparatus for automatically sensing recorded diagrams, for numerically representing the read-out information, and for printing the same.

Another object of the invention is to control the automatic evaluation of recorded diagrams by electronic program control means.

Another object of the invention is to provide electronic apparatus for quickly and reliably evaluating a plurality of concentric circular tracks recorded on a rotary diagram carrier.

SUMMARY OF THE INVENTION

With these objects in view, the present invention provides an electronic program control means which controls not only the electronic sensing of several recorded tracks, but also the numerical representing of the read-out values in columns selected by a tabulating device.

In a preferred embodiment, the program control means includes a command counter, which during each revolution of the record carrier, effects the evaluation of one circular recorded track, and shifts a sequential counter one step for determining which track is evaluated. A timing unit following the two counters, controls the sequential performance of the several steps required for evaluation.

In accordance with another feature of the invention, the timing unit successively starts the sensing operation, the shifting of the sensing means to another recorded track, a transfer of a value from an intermediate storage to a printing unit, and the printing of the value under the control of the command counter, the end of each of these operations causing the shifting of the command counter to positions representing clearing, sensing, switching of tracks, and printing.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
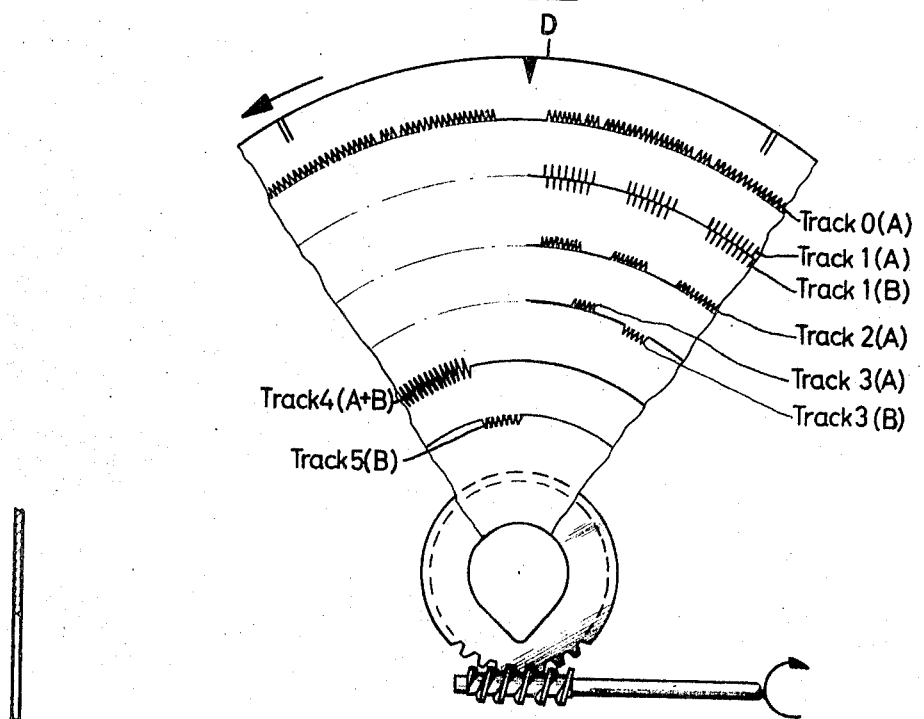
FIG. 1 is a fragmentary plan view illustrating a circular record carrier with several recorded tracks.

As shown in FIG. 1, a circular record carrier disk D has a plurality of interrupted recorded tracks along parallel concentric circles. Each track can be made of an inner track and an outer track, for example, track 1 has an outer track half A and an inner track half B. Information can be recorded on track half A and other information recorded on track half B. A third information can be recorded in an intermediate position on both track halves A and B. In the example illustrated in FIG. 1, in which 6 tracks are provided, recordings are possible in 18 sub-tracks. However, not all sub-tracks are used, in accordance with the following table:

| | | |
|---|---|---|
| 1. track 0, track half A: | | decimal factor for number of work pieces |
| | B: | not used |
| | A and B: | not used |
| 2. track 1, track half A: | | half of number of work pieces |
| | B: | half of number or work pieces |
| | A and B: | not used |
| 3. track 2, track half A: | | production time |
| | B: | not used |
| | A and B: | not used |
| 4. track 3, track half A: | | cause of interruption 1 |
| 5. | B: | cause of interruption 2 |
| 6. | A and B: | cause of interruption 3 |
| 7. track 4, track half A: | | cause of interruption 4 |
| 8. | B: | cause of interruption 5 |
| 9. | A and B: | cause of interruption 6 |
| 10. track 5, track half A: | | cause of interruption 7 |
| 11. | B: | cause of interruption 8 |
| 12. | A and B: | cause of interruption 9 |

Figure 2:
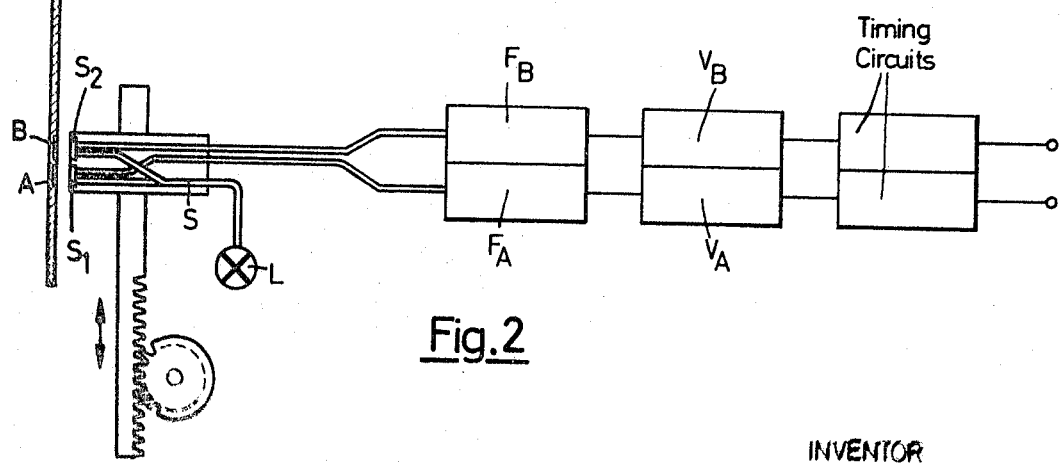
FIG. 2 is a schematic view illustrating a sensing device for a record carrier.

Sensing means for sensing the two track halves of each track are shown in FIG. 2. The sensing means S has two sensing heads which are respectively sensing the two track halves A and B of each track, and after one revolution of the record carrier D, when one track is completely sensed, the two sensing heads are shifted to the next track for reading out the two track halves A and B of the same. The shifting of the sensing heads is effected by a cam, not shown, under the control of an electric signal pulse from program control means.

A flexible light-guiding means guides the light of a lamp L to the two sensing heads S1 and S2 from which the light falls on the recorded track halves A and B, and is reflected by the same in a different manner than by the blank surface portions of record carrier D. The reflected light is guided through two other light-guiding means to photocells $F_A$, $F_B$ which transform the light pulses into electrical pulses which are transmitted through amplifiers $V_A$ and $V_B$ to the program control means.

As shown in FIG. 1, some of the recordings, for example on track 0 and track 4, are in the form of a beam of constant width, the recording on track 0 being only on a track half, while the recording on track 4 is a beam of double width filling both track halves A and B. Track 1 includes two track halves A and B, each of which has recordings consisting of a plurality of transverse lines which are staggered to each other. It is evident that the lines of track halves 1A and 1B generate a series of light pulses transformed into electric pulses by photocells $F_A$ and $F_B$. Each pulse may be used for representing a work piece so that the number of lines of each track half corresponds to half the number of work pieces. The beam-shaped recordings on track 2 represent production times, and the beam-shaped recordings on tracks 3, 4 and 5 represent time period during which production was interrupted, and the cause of the interruption. During the sensing of beam-shaped recorded tracks, the respective photo-cell generates an electric signal pulse when passing from the white surface of the record carrier D to a dark beam, and a second signal pulse at the end of the dark beam upon the transition from dark to the light surface of the record carrier. In order to represent the time periods recorded in the form of bean-shaped tracks in units of time, the length of each track beam is represented by the number of timing pulses which are generated at a high frequency. The timing pulses may be taken, for example, from a perforated rotary disk whose opening controls a light barrier, such as a source of light and a photocell. The rotary perforated disk is mechanically connected with the drive of the record carrier D which rotates continuously at uniform speed, and may perform one revolution during 12 hours.

In the preferred embodiment of the invention, a frequency of the timing pulses of 14.4 kHz has been selected, which corresponds to a resolution of 0.1 minutes when a record carrier performs one revolution of 360° during 12 hours. The signal pulse transmitted by a photocell $F_A$ or $F_B$ at the beginning of the sensing of a beam-shaped recording opens a gate which permits the passage of timing pulses to an electronic storage device, and the signal pulse generated at the end of the beam-shaped recording blocks the gate so that the time pulses stored in the electronic storage device and counted by the same represent the time period corresponding to the length of a sensed beam-shaped recording. After a complete revolution of the record carrier disk D, the entire circular track is evaluated, and a corresponding number of pulses is stored in the electronic storage device. As will be explained hereinafter in greater detail, the value stored in the storage device is transmitted to a printer, and printed in a selected column by means of a tabulating device. In this manner, the several beams are successively evaluated due to the shifting of the sensing head to the next following circular track when the sensing of the preceding track has been completed.

The track 0 has a beam-shaped recording with interruptions, which serves a particular purpose, namely the determination of the decimal factor. During mass production of small articles or work pieces such as screws, nuts, nails, rivets, and the like, the recording apparatus is preset in such a manner that not each work piece, but only every 10th, 100th or 1,000th work piece is represented by a line in one of the tracks 1A and 1B. It is consequently necessary that this decimal factor is considered during the evaluation and consequent printing of the recordings. This may be done in two ways. The recording device can be provided with decimal factor keys, and the respective key actuated before the counting of the work pieces and the respective recording of the number of the same starts. The actuated decimal factor key prints a legible number representing the decimal factor on the record carrier D. During the evaluation, a corresponding decimal factor key is actuated by the operator, and places the decimal point accordingly during the printing of the number. If the decimal factor "0" is selected, the actually recorded number of lines in track 1 will be counted and printed. If the decimal factor "1" is selected, the number of lines of track 1 would be counted during evaluation, but during printing, an additional zero would be added, corresponding to a multiplication by 10. Correspondingly, if the decimal factor "2" is selected, two zeros are added to the printed number of counted work pieces. This would correspond to a multiplication by 100, and if the decimal factor "3" is selected, three zeros are added to the number corresponding to a multiplication by the factor 1,000.

In the illustrated example, this operation is carried out automatically, and the decimal factor track 0 represents the number of decimal orders which has to be considered in shifting the decimal point to the right during the printing of the number of work pieces.

Figure 3:
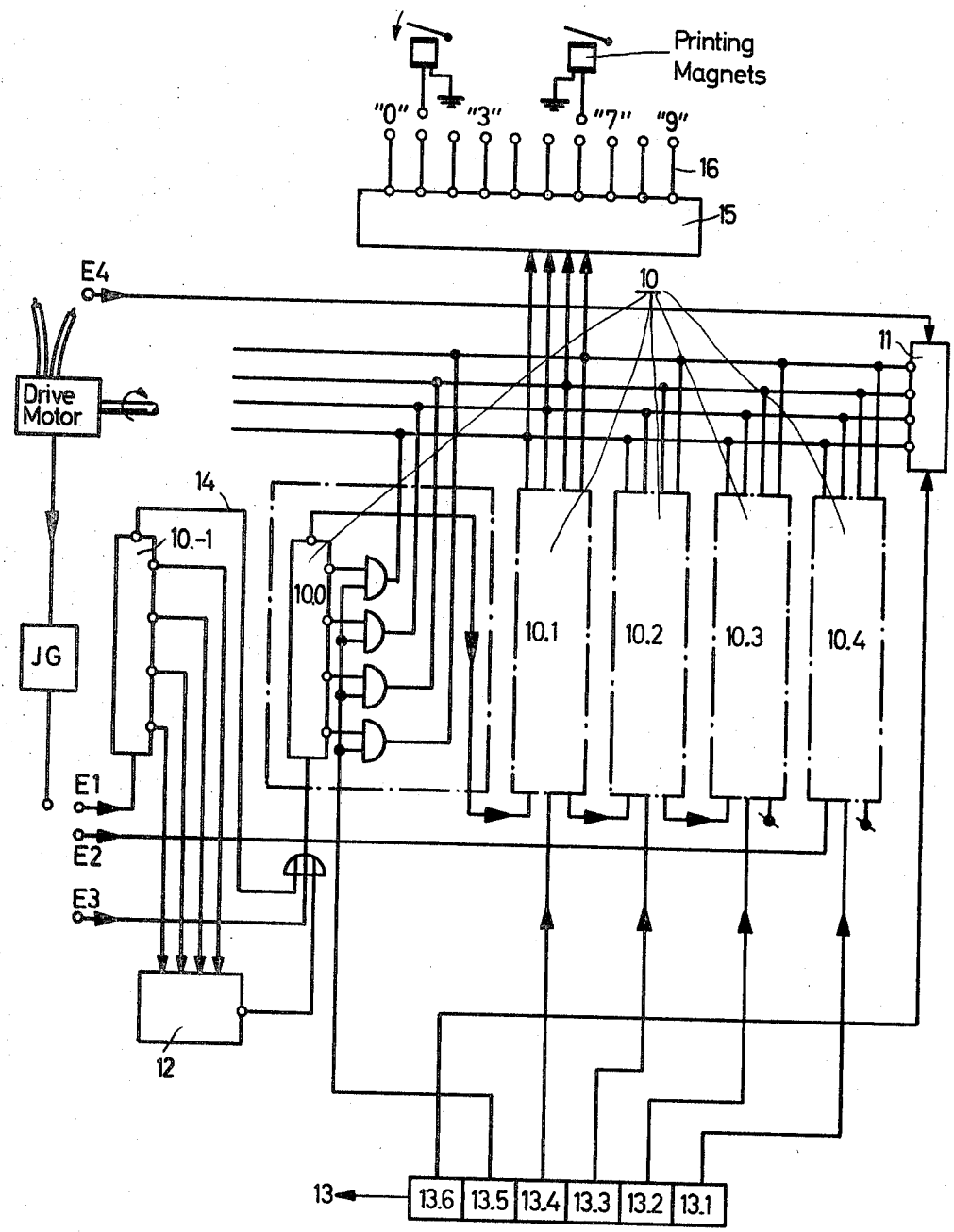
FIG. 3 is a circuit diagram schematically illustrating an electronic storage device receiving information from the sensing means and storing the same for transfer to printing means.

A decimal factor storage 11 in FIG. 3 is provided which controls the addition of zeros in accordance with a number of zeros stored in the decimal factor storage by reading out track 0. The decimal factor storage is then controlled by the program control means to effect the required shifting of the counted number of work pieces to the left, and the addition of the respective zeros at the end of the number.

The decimal factor track 0 may be a beam without any interruption, which would represent the decimal factor 0 so that the number of lines in track 1 would be printed. When the decimal factor "1" is to be represented by the decimal factor track 0, the same has in corresponding distances a single interruption, which is sensed and recognized as the decimal factor "1," requiring the adding of a zero at the end of the counted and printed number. If the decimal factor track 0 is twice interrupted, corresponding to the decimal factor "2," or three times interrupted, corresponding to the decimal factor "3," two or three zeros, respectively, are printed at the end of the number so that the actual number of work pieces instead of the number of lines in track 1 is printed.

A timing means, not shown, is combined with sensing means to search for a track portion which is continuous for at least 3 minutes. After these 3 minutes, a sensing operation of 6½ minutes takes place so that up to three interruptions, corresponding to the decimal factor "3," can be sensed. Within this period, the interruptions of the decimal factor track are counted, and transmitted to the decimal factor storage device 11. The time period required for registering the decimal factor is more than 8 minutes during which the beam portions and brighter interruptions of the decimal factor track 0 can reliably determined.

The number of pieces, or a decimal fraction of the same as explained above, are represented by lines in the track halves 1A and 1B. This manner of recording has been selected in order to obtain a very high resolution and twice as great a distance between adjacent lines as compared with the recording on only one track half.

It is possible to clearly record over 2,000 lines in two track halves 1A and 1B in one circular recording on a record carrier disk D.

The apparatus is constructed in such a manner that the sensing of the number of work pieces can only start when both photocells $F_A$ and $F_B$ of the sensing means sense white blank surface portions of the record carrier D. In this manner, it is prevented that any line representing a pulse is counted a second time after a turning of record carrier disk D through exactly 360°. The lines of the track halves A and B of track 1 are separately, but simultaneously, read out by sensing heads $S_1$ and $S_2$. A timing circuit is used to determine whether the thickness of the lines of each track half is not greater than a maximum thickness so that the sensing head is passed within a predetermined time. The checking of the thickness of the recorded lines is carried out in order to prevent that damaged surface portions of the record carrier, or spots on the same, are counted as work pieces. If the recording is correct, each line has the same thickness as any other line. If the thickness of a line has been recognized to be correct, the pulses generated under the control of the lines of the track halves are added and entered into an electronic storage device. If a sensed marking takes a longer time than required by a correct line, it is neither counted nor entered into the storage device.

Production times are indicated in track 2, but only in track-half 2A. The electric signal derived from each beam-shaped recording is counted by the timing pulse having the value of 0.1 minutes, and the respective number of timing pulses transmitted to the electronic storage device. After rotation of record carrier disk D through 360°, the sensing of track 2 is completed.

In the present example, nine possible causes for interruptions of the production is recorded in tracks 3, 4 and 5 by three different recordings for each track, namely, recordings A, B, and A and B. This manner of representation is possible since different causes of interruptions cannot simultaneously occur. The beam-shaped recordings representing reasons for interruptions are also counted with a value of 0.1 minute for each pulse, and the read-out value added in the electronic storage device. Each track has been read out when the record carrier disk D has turned 360°.

The operator must actuate a corresponding key or switch in order to inform the registering device what the cause of the interruption which is being sensed was, whereupon the program control means determine in which track and more specifically track half, the time of interruption is to be recorded and later read out. From the preceding Table, it can be determined in which track or track halves, the causes of interruptions are represented and sensed. Depending on which track is being sensed, the program determines in which column of a tabulating device of the time of interrupted production read our during one revolution of the record carrier, is to be printed.

The automatic evaluation of a track is carried out as follows: An electromotor rotates record carrier D once a single revolution of 360° so that a track is sensed and read out. During the rotation of the record carrier disk, sensing means S senses the beam-shaped recordings, or the lines of a recording, and transmits the information to the electronic storage device. After the sensing has been completed, the program control means, which will be described with reference to FIG. 4, effects the printing of the value stored in the electronic pulse storage device, which will be described with reference to FIG. 3, so that the value if printed in a predetermined column selected by a tabulating device, whereupon the sensing means S is mechanically shifted to the next circular track.

After the printing, record carrier disk D performs the next revolution, and another track is read out and evaluated. The operation is repeated for each track on the record carrier. In the present example, in accordance with the above Table, a complete evaluation of a record carrier requires 12 revolutions of the same.

The sensing is effected as follows: Sensing station S is positioned to sense the outermost track 0. Record carrier disk D is in a zero position in which it was inserted into the apparatus. A motor, not shown, slowly drives record carrier D, and track 0 is sensed during a complete revolution of the record carrier. The impulses generated in the photocells $F_A$ and $F_B$, or in both photocells, are used for the evaluation. When track 1, for example is sensed, each line of the track halves causes the respective photocells to generate a pulse which is stored in a storage device shown in FIG. 3.

The basic construction of the electronic storage device in FIG. 3 is known, and the storage device serves the purpose of counting the pulses generated by the sensing means S, or timing pulses. The storage device is binary-decimal in the several orders, and comprises the order units 10.0, 10.1, 10.2, 10.3, and 10.4, a decimal factor storage 11, and an additional order unit 10.−1 preceding the order unit 10.0 and serving the purpose of transmitting the 0.1 minutes representing pulses of the timing pulse in the form as minute pulses to the order unit 10.0. Only the order units 10.0 to 10.4 control printing operations.

The decimal factor storage 11 determines the order value of the number printed under the control of the order units 10.0 to 10.4. The order units 10.−1 and 10.0 are connected with the rounding-off device 12 which effects that, if five or more time pulses are stored in the order unit 10.−1, the order unit 10.0 registers the value "1" while four or fewer impulses in order unit 10.−1 do not cause the entering of the unit digit into the order unit 10.0.

A counter 13 is connected with the order unit 10.1 to 10.4 and to the decimal factor storage 11 for serially printing the value stored in storage device 10. When the command "print out" is given, the counter 13 effects the transmitting of the values of the orders $10.^4$, $1.^3$, $10.^2$ and $10.^0$, and then the decimal factor storage 11, to the keyboard of a tabulating device of a printing counting machine, not shown.

As explained above, the information of the factor storage 11 determines only the number of orders which the decimal point is displaced, and consequently the shifting of the paper carriage with automatic printing of the respective number of zeros at the end of the number.

Four input lines are connected with the electronic storage device 10. The input $E^1$ supplies timing pulses representing each 0.1 minutes to the order unit 10.−1 so that 1 minute is printed as the smallest time unit under the control of the order unit 10.0. The input $E^2$ is connected with the order unit 10.4 which is not used as a decimal order, but receives in the form of a number the cause of interruption 1 to 9, which number is printed spaced from the numerical time value printed under the control of the order units 10.0 to 10.3.

The input $E^3$, which is connected by an OR-gate to the order unit 10.0, receives the pulses generated by the sensing means S sensing track 1A and 1B. Due to the OR-gate, the preliminary order unit 10.−1 is not used when track 1 is evaluated.

When track 0, representing the decimal factor, is sensed, the generated pulses are received by input $E^4$ which enters the value of the decimal factor 0, 1, 2 or 3 into decimal factor storage 11.

During the reading out of a track having beam-shaped recordings, timing pulses, corresponding to a frequency of 14.4 kHz and to one revolution of record carrier D during 12 hours, are counted and entered through preliminary order unit 10.−1 into the order unit 10.0 to 10.3. If a series of lines is sensed, the respective numbers representing the work pieces, after consideration of the decimal factor, are directly stored in the order units 10.0 to 10.3.

After the record carrier has been completely read out, and all sensed values stored, the program control means transmit a pulse representing "print out" whereupon the stored value is printed.

In the event that the tabulating device cooperates with a serial printer, the program control means triggers the counter 13 so that the unit 13.1 actuates the order unit 10.4 to print. The number stored in order unit 10.4 is supplied through a decoding device 15 to one of lines 16 in the form of an impulse. Each of the lines 16 represents one of the digits 0 to 9 which represent the nine causes of interruption of the production.

Each line 16 is connected with an electromagnet, not shown, which sets the respective order of the printer to the value which was sensed, or which sets a corresponding pin in the respective order of a pin carriage. Assuming that the read out track had a recording for the reasons of interruption 1 to 9, one of the digits 1 to 9 is printed whereupon, under the control of the program control means, several idle steps take place so that the printed number representing the cause of interruption is spaced from the number representing a time period or the number of work pieces.

When the contents of the order unit 10.4 have been printed, the program control means transmit a pulse to the counter 13 so that counter unit 10.2 becomes operative and interrogates order unit 10.3 of the storage device 10 so that the number stored in order unit 10.3 is transmitted through the decoding device 15 to one of lines 16 so that the respective number is printed. In the same manner, the order units 10.3, 10.2, and 10.1 and finally 10.0 are interrogated and printed out under control of counter units 13.2 to 13.5 actuated by signals from the program control means.

Finally, counter unit 13.6 is actuated which interrogates the decimal factor storage 11 which contains one of the numbers 0, 1, or 2. If the decimal factor storage 11 stores the number 0, the number stored in order units 10.0 to 10.3 is the true number of the work pieces, and can be directly printed. If decimal factor storage 11 stores the digit 1, the paper carriage of the accounting machine performs one step, and a zero is added as the lowest order. If the number 2 is stored in decimal factor storage 11, the paper carriage performs two steps and two zeros are printed at the end of the four order number printed under the control of the order units 10.0 to 10.3. As shown in FIG. 1, the recording on track 0 has two interruptions, corresponding to a decimal factor 2.

In the event that the tabulating device is associated with a parallel printer, first order unit 10.4 is interrogated by counter unit 13.1, and printed out, whereupon the order units 10.0 to 10.3 are simultaneously interrogated and printed out. As a final step, a number of zeros corresponding to the decimal factor stored in storage 11 is added.

For printing values as well as for tabulating the carriage by adding zeros to a printed value, a device may be used as disclosed in the U.S. Pat. 3,452,852. The print magnets according to FIG. 3 may be of the same type as disclosed in the aforementioned U.S. Pat. Carriage tabulations without writing numbers may be easily carried through by tapping the space bar of a well known typewriter by means of a well known electro-magnet or by help of a device as disclosed in the U.S. Pat. 3,405,390.

The order unit 10.0 which counts the number of work pieces is shown to be connected with four AND-gates which are also connected with the counter unit 13.5. The four lines by which each order unit is connected with the four lines from the decimal factor storage, represent code elements.

The operations described with reference to FIGS. 2 and 3 are started and controlled by a program control means shown in FIG. 4, which includes a command counter 20, a sequential counter 21, and a timing unit 22. The command counter 20 determines which steps are to be carried out. The sequential counter 21 receives information related to a particular printing position or column and indicating the type of information and what has to be done with the respective information. Every information determined by the sequential counter 21 is interpreted during the cycle of command counter 20 which has four counter units 20.0, 20.1, 20.2, and 20.3. The unit 20.0 starts clearing of the entire apparatus, particularly of storage device 10. The unit 20.1 starts the sensing of the track of record carrier D on which the sensing means S is located. The unit 20.2 of command counter 20 starts the shifting of the sensing head of sensing means S to another track, and transmission of the value from the storage device 10 to the printer controlled by lines 16. The unit 20.3 of command counter 20 starts the printing operation whereby the cycle of command counter 20 is completed.

Sequential counter 21 consists of counter units 00, 01 to 09, 10, 11, 12. Unit 21.00 is actuated after a complete cycle of sequential counter 21, and effects at the beginning of the evaluation of a record carrier disk, the clearing and setting back of all devices to an initial position. Unit 21.1 starts the reading out of the decimal factor from the track 0, and its evaluation. Unit 21.02 effects the evaluation of the number of work pieces. Unit 21.03 effects the reading out and the evaluation of the production time, and units 21.04 to 21.12 effect the reading out and evaluation of tracks 3, 4 and 5 to determine the causes of interruptions 1 to 9.

A timing device 22 cooperates with command counter 20 and sequential counter 21 and includes four multivibrators or flip flops FF1 to FF4. The flip flops have, respectively, output lines 23, 24, 25, 26 transmitting signals for starting functions of the apparatus by which the recorded information is evaluated.

The other terminals of the flip flops FF1 to FF4 are connected by lines 52 to 55, respectively, with a NOR-gate 27 whose output is connected with an AND-gate 29 whose output 30 is connected with an AND-gate 32 connected with the input of sequential counter 21. AND-gate 32 is connected by a line 31 with the unit 20.0 of command counter 20. Line 30 is also connected with input of unit 20.0. A line 51 supplies a base signal to the AND-gate 29 to the command counter 20 and to sequential counter 21, depending on gates 29 and 32. When signals in lines 31 and 30 are supplied to AND-gate 32, sequential counter 21 is shifted to the respective next following unit.

Figure 4:
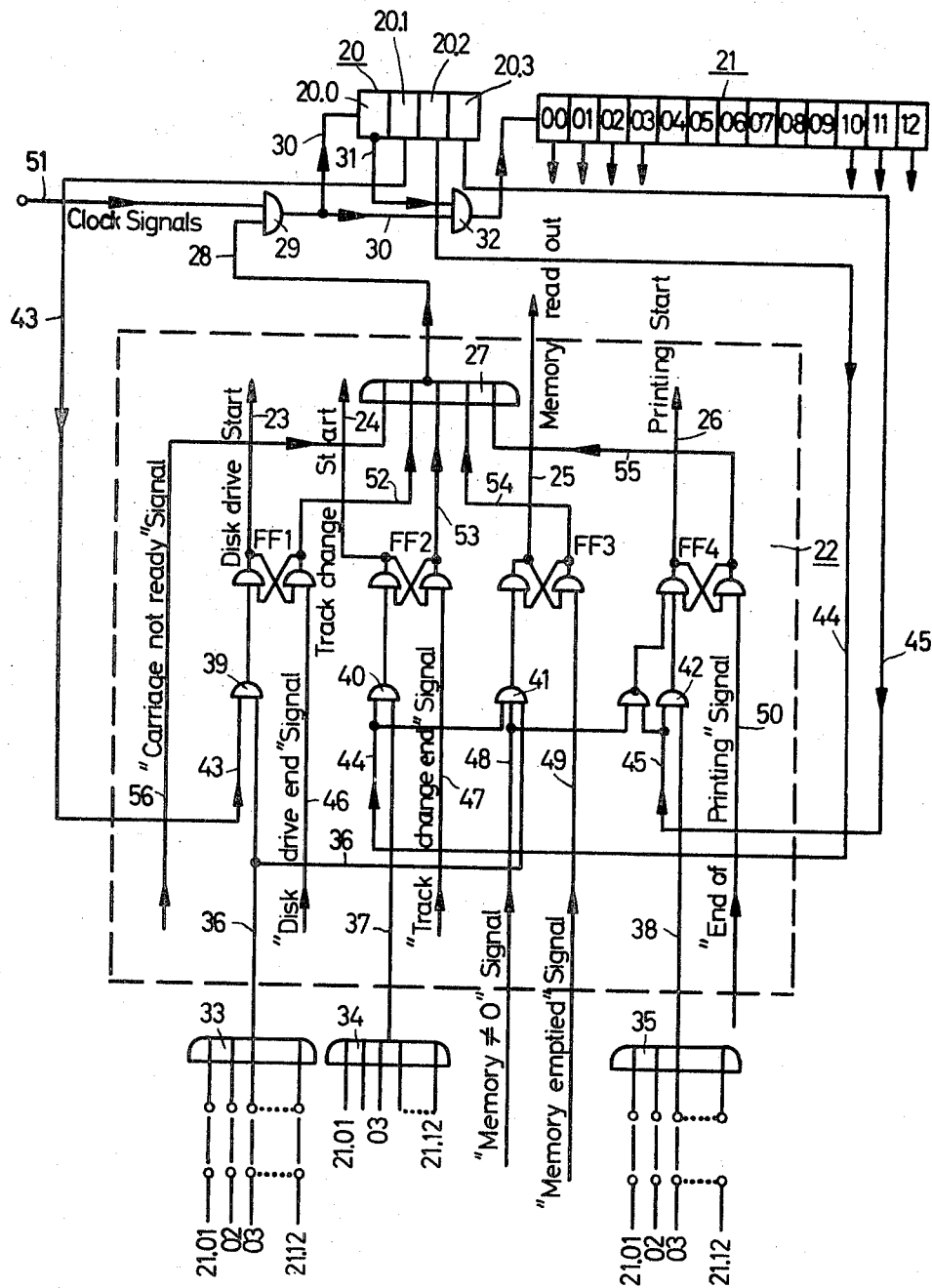
FIG. 4 is a diagram schematically illustrating the electronic program control circuit according to the invention.

The outputs of units 21.01 to 21.12, schematically shown in the upper part of FIG. 4, are connected with three OR-gates 33,34,35 as schematically shown in the lower portion of FIG. 4. The output lines leading from counter 21 to the OR-gates 33 and 34 can be differently connected in accordance with programs, while the lines leading to the OR-gate 34 are permanently connected.

The outputs of the OR-gates 33 to 35 are connected by lines 36,37 and 38 and by corresponding AND-gates 39,40 and 42 to the left sides of flip flops FF1, FF2 and FF4. A line 43 leading to the AND-gate 39, is connected with the output of counter unit 20.1. Line 36 is also connected with an AND-gate 41 which has an output connected with flip flop FF3. The second connection with the AND-gate 40 of flip flop FF2 is connected with the output of unit 20.2 of command counter 20 by a line 44. Line 44 is also connected with an input of the AND-gate 41 of flip flop FF3.

A line 45 connects unit 20.3 of command counter 20 with a second input of the AND-gate 42 of flip flop FF4. These connections are omitted in FIG. 4 for the sake of clarity and simplicity. A line 46 connects flip flop FF1 directly with the drive of the record carrier disk D and transmits at the end of a revolution of the record carrier a signal to flip flop FF1 by which the same is shifted. A line 47 is connected with flip flop FF2 and shifts the same when the sensing means S has been shifted to another track. A line 48 is connected with a third input of AND-gate 41 and is connected with the storage device 10 to transmit a signal from the same when the number stored in storage device 10 is different from zero. A line 49 is connected with flip flop FF3 and transmits a signal to the same when the number stored in storage device 10 has been transmitted to the printer, and the order units 10.0 to 10.4 are cleared and store zero value. A line 50 is connected with flip flop FF4 and switches the same when the printing has been completed.

The program control means shown in FIG. 4 operates as follows: In the position of rest, the flip flops FF1 to FF4 are inactive, and the inputs 52,53,54 and 55 of the NOR-gate 27 are not energized. The position of the paper carriage of the accounting machine does not yet correspond to the position required for printing, and therefore a signal representing the wrong position of the paper carriage is transmitted to line 56 and to the NOR-gate 27. The output signal of gate 27 is transmitted to AND-gate 29 and blocks the same so that the basic signal on line 52 cannot pass the AND-gate 29 so that counters 20 and 21 cannot be shifted to the next following counter unit. By tabulation of the carriage of the accounting machine to the first column, the signal on line 56 is cancelled, and NOR-gate 27 and AND-gate 29 open. The basic signal on line 51 is applied through gate 29 and 30 to counter unit 20.0 so that counter unit 20.1 becomes operative. At the same time, sequential counter 21 is shifted from unit 21.00 to unit 21.01 so that a signal passes through OR-gate 33 and AND-gate 39, and flip flop FF1 is shifted to its other position in which flip flop FF1 transmit a signal through the NOR-gate 27 to the AND-gate 29 and blocks the base signal on line 51 so that command counter 20 is not shifted. Line 23 transmits to the sensing means S and to the drive means of record carrier D the command "sense track O," and this command is maintained by flip flop FF1 until through line 46 a command "one revolution of record carrier D sensed" is transmitted for shifting flip flop FF1 to its initial position. The sensing of track O is now completed.

The NOR-gate 27 provides no signal through line 28 so that the basic signal is transmitted from line 51 through AND-gate 29 and line 30 to command counter 20 which is shifted to render the counter unit 20.2 operative. At this time, unit 21.01 of sequential counter 21 remains operative. Consequently, the AND-gate 40 receives two signals from counter unit 20.2 and from counter unit 21, and AND-gate 41 receives corresponding signals so that the flip flops FF2 and FF3 are shifted and block the basic signal 51 through NOR-gate 27 and AND-gate 29.

In these positions of flip flops FF2 and flip flops FF3, flip flop FF2 initiates the shifting of the sensing means to the next following track, that is from track O to track 1.

Flip flop FF3 simultaneously initiates the transfer of the stored value from storage device 10 to the printer. A signal "-track shifted" is transmitted through line 47 to flip flop FF3 so that the same is shifted back. When both flip flops FF2 and FF3 are again in the initial positions, the NOR-gate 27 opens through line 28 the AND-gate 29 so that a further basic signal is supplied to command counter 20 which shifts the same from unit 20.2 to unit 20.3. Unit 20.3 is connected with line 45 and AND-gate 42 so that flip flop FF4 is shifted, since unit 21.01 of sequential counter 21 also provides a signal to OR-gate 53 and line 38. In the new position of flip flop FF4, a signal "-print" is transmitted to the printer by line 26.

A signal "print finished" is then supplied through line 50 so that flip flop FF4 is shifted back to its initial position, and NOR-gate 27 and AND-gate 29 open again. The basic signal in line 51 shifts command counter 20 from unit 20.3 back to unit 20.0 so that storage device 10 is cleared. A signal from counter unit 20.0 is supplied to the AND-gate 32, together with a basic signal through gate 29, line 30 and gate 32 so that sequential counter 21 is shifted from unit 21.01 to 21.02. Track 1 of record carrier D is now read out as described with reference for track 0.

Regarding the programming, it should be noted that the OR-gate 33 may not receive a signal in various positions of sequential counter 21, and information from the record carrier due to the opening of one of the connecting lines. As a result, the flip flop FF1 is not tripped, and the AND-gates 39 and 40 remain closed so that "sensing" and "printing" are skipped. This may be programmed if the respective information is never recorded on the record carrier, or is not to be evaluated under the particular circumstances. Such skipping shortens the time required for evaluation of the recorded information on a record carrier.

Printing is only started if the storage device 10 stores a numerical value different from zero. This is effected by a corresponding pulse through line 48 and the AND-gate 41. If the accounting machine prints successively in the same column, this is particularly advantageous since no intermediate spaces are obtained. During horizontal printing, printing operations are necessary even if the storing device 10 stores no numerical value, since the carriage of the accounting machine has to move in line direction. In this event, the OR-gate 35 is programmed to the command "must print."

Command counter 20 and sequential counter 21 are preferably sequential ring registers. The counter 13 shown in FIG. 3 can be constructed in the same manner.

The individual components of the above-described apparatus can be obtained in the trade, and are not an object of the invention. Components in accordance with the newest developments in the electronic arts are advantageously used.

It will be understood that each of the elements described above, or two or more together, may also find a useful application in other types of apparatus for automatically evaluating a record carrier differing from the types described above.

While the invention has been illustrated and described as embodied in an apparatus including sensing means for recordings, an electronic storage device, and program control means for evaluating circular recordings on a rotary record carrier disk, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. Apparatus for automatically evaluating recordings on a rotary record carrier, comprising sensing means for sensing recordings along circular concentric tracks on a record carrier and for generating information pulses representing the recorded information; setting means for moving said sensing means between different positions for sensing different tracks; electronic storage means receiving the generated information pulses for storing the sensed information; printing means controlled by said storage means for printing the stored information; and program control means including a sequential counter having a plurality of counter units respectively associated with different tracks for causing said setting means to place said sensing means successively on different tracks, a command counter for effecting storing of the stored information by said printing means, said command counter shifting said sequential counter after each revolution of said second carrier one step to the respective next following position after said sensing means has sensed a track, and a timing control device controlled by said sequential counter and controlling said command counter, said timing control device effecting sequential sensing of a track by said sensing means, shifting of said sensing means to another track, transfer of information from said storage means to said printing means, and printing of the information, said command counter having a plurality of counter units respectively associated with clearing, sensing, shifting and printing operations; said timing control device transmitting at the end of each said operation a signal to said command counter for rendering the respective next following command counter unit operative.

2. Apparatus as claimed in claim 1 wherein said printing means includes tabulating means for printing in different columns; and wherein said program control means controls said tabulating means so that the information is printed in selected columns.

3. Apparatus as claimed in claim 1 wherein said track has a line recording having a plurality of spaced lines along said track; wherein said sensing means generate an information pulse for each sensed line; and wherein said storage means count said pulses and store the number of the same.

4. Apparatus for automatically evaluating recordings on a record carrier having a plurality of circular tracks with records thereon, comprising drive means for rotating the record carrier about an axis; sensing means for sensing a recording along a track on the record carrier and for generating information pulses representing the recorded information; setting means for moving the sensing means between different positions for sensing different tracks; an electronic storage means receiving the generated information pulses for storing the sensed information in the form of numerical values; printing means controlled by said storage means for printing said numerical values; and electronic program control means including counter means, and controlling the operation of said sensing means, storage means, printing means, and setting means for setting after each revolution of said record carrier during which said sensing means senses the recording on one of said tracks, said sensing means to a position sensing another track during a following revolution of the record carrier.

5. Apparatus as claimed in claim 4 wherein said program control means include a command counter for effecting storing of the sensed information in said storage means and printing of the stored information by said printing means, and a sequential counter having a plurality of counter units respectively associated with different tracks for causing said setting means to place said sensing means successively on different tracks; and wherein said command counter shifts said sequential counter to the respective next following counter unit after sensing each track.

6. Apparatus as claimed in claim 5 wherein said recordings on said tracks include at least one beam-shaped recording and at least one line recording having spaced lines transverse to said track; wherein said sequential counter selects the track which is sensed by said sensing means, and simultaneously sets said storage means to count the number of pulses of said sensing means and thereby the number of lines of a line recording, or to respond to the pulses of said sensing means representing the beginning and end of said beam-shaped recording.

7. Apparatus as claimed in claim 5 wherein said program control means includes a timing control device controlled by said sequential counter and controlling said command counter; and wherein said timing control device sequentially effects sensing of a track by said sensing means, shifting of said sensing means to an other track, transfer of a numerical value from said storage means to said printing means, and printing of the numerical value; wherein said command counter has a plurality of command counter units respectively associated with clearing, sensing, shifting, and printing operations; and wherein said timing control device transmits at the end of each said operation a signal to said command counter for rendering the respective next following command counter unit operative.

8. Apparatus as claimed in claim 7 wherein said timing control device includes a flip flop for each of said operations; wherein said command counter and said sequential counter provide a signal to effect the setting of said flip flops to a start position, and provide at the end of each operation a signal for shifting the respective flip flop to a stop position.

9. Apparatus as claimed in claim 4 comprising an impulse generator operated by said drive means for generating timing pulses transmitted to said storage means; wherein said storage means includes a gate receiving said timing pulses, and also pulses from said sensing means representing the beginning and end of recordings, and has electronic pulse counter means receiving, counting, and storing the timing pulses passing through said gate.

10. Apparatus as claimed in claim 9 wherein said sensing means include a photocell generating a pulse at the beginning and end of a recording sensed by said sensing means and connected with said gate to open the same at the beginning of a recording and to close the same at the end of a recording.

11. Apparatus as claimed in claim 9 wherein said impulse generator includes a rotary perforated disk, a source of light on one side, and a photocell on the other side of said disk for generating said timing pulses; and wherein said drive means of said record carrier drive said disk.

12. Apparatus for automatically evaluating recordings on a record carrier, said record carrier having a plurality of tracks and recordings on said tracks including at least one beam-shaped interrupted recording, and at least one line recording having a plurality of spaced lines transverse to the respective track; electronic storage means receiving the generated information process for storing the sensed information in the form of numerical values; printing means controlled by said storage means for printing said numerical values; and electronic program control means including counter means and controlling the operations of said sensing means, storage means, counter means, and printing means so that the same are carried out in a predetermined sequence; and a circuit receiving pulses from said sensing means and having first and second conditions and distinguishing between said beam-shaped recording and said line recording, said circuit being connected with said storage means and including timing means for blocking in said second condition pulses having a longer duration than a pulse caused by a line of said line recording having a predetermined maximum thickness so that only said lines are counted.

13. Apparatus for automatically evaluating recordings on a record carrier comprising sensing means for sensing a recording along a track on the record carrier and for generating information pulses representing the recorded information, said track including two adjacent track halves, and recordings being recorded on any one of said track halves or on both; said sensing means including two sensing heads for sensing said track halves, respectively; electronic storage means receiving the generated information pulses for storing the sensed information in the form of numerical values; printing means controlled by said storage means for printing said numerical values; and electronic program control means including counter means and means for controlling said sensing means to selectively sense said track halves successively and simultaneously, respectively, said program control means controlling the operations of said sensing means, storage means, counter means and printing means so that the same are carried out in a predetermined sequence.

14. Apparatus as claimed in claim 13 wherein said program control means control said drive means to effect one complete revolution of said record carrier when said sensing means senses one of said recordings.

15. Apparatus for automatically evaluating recordings on a record carrier, comprising sensing means for sensing a recording along a track on a record carrier and for generating information pulses representing the recorded information, said track having a beam-shaped interrupted recording having beam-shaped portions whose lengths represent time, said sensing means sensing the beginning and end of said beam-shaped portions; an electronic storage means receiving the generated information pulses and storing information regarding the length of the time represented by said beam-shaped portions, and also storing the sensed information in the form of numerical values; printing means controlled by said storage means for printing said numerical values; and electronic program control means including counter means, and controlling the operations of said sensing means, storage means, counter means, and printing means so that the same are carried out in a predetermined sequence.

* * * * *